US007409439B2

(12) United States Patent
Raja et al.

(10) Patent No.: US 7,409,439 B2
(45) Date of Patent: Aug. 5, 2008

(54) REDUCING OVERHEAD IN REVERSE PROXY SERVERS WHEN PROCESSING WEB PAGES

(75) Inventors: Nagendra Kumar Raja, Karnataka (IN); Lakshmanan Aruunachalam, Tamil Nadu (IN)

(73) Assignee: Sun Microsystems Inc., Santa Clara, CA (US)

( * ) Notice: Subject to any disclaimer, the term of this patent is extended or adjusted under 35 U.S.C. 154(b) by 875 days.

(21) Appl. No.: 10/314,343

(22) Filed: Dec. 9, 2002

(65) Prior Publication Data

US 2004/0111491 A1    Jun. 10, 2004

(51) Int. Cl.
    G06F 15/16    (2006.01)
    H04L 9/32    (2006.01)
(52) U.S. Cl. ............... 709/220; 709/238; 713/169
(58) Field of Classification Search ......... 709/229, 709/217, 231, 245, 227, 228, 220, 224, 226, 709/238; 713/201, 166, 169; 707/6, 10; 370/390, 395; 705/40, 42
    See application file for complete search history.

(56) References Cited

U.S. PATENT DOCUMENTS

| | | | | |
|---|---|---|---|---|
| 6,640,302 | B1 * | 10/2003 | Subramaniam et al. | 713/169 |
| 6,725,424 | B1 * | 4/2004 | Schwerdtfeger et al. | 715/513 |
| 6,965,939 | B2 * | 11/2005 | Cuomo et al. | 709/229 |
| 7,006,993 | B1 * | 2/2006 | Cheong et al. | 705/38 |
| 7,032,031 | B2 * | 4/2006 | Jungck et al. | 709/246 |
| 2002/0065938 | A1 * | 5/2002 | Jungck et al. | 709/246 |
| 2002/0091757 | A1 * | 7/2002 | Cuomo et al. | 709/203 |
| 2003/0079027 | A1 * | 4/2003 | Slocombe et al. | 709/229 |
| 2003/0208563 | A1 * | 11/2003 | Acree et al. | 709/219 |
| 2004/0190468 | A1 * | 9/2004 | Saijonmaa | 370/312 |
| 2005/0044213 | A1 * | 2/2005 | Kobayashi et al. | 709/224 |
| 2006/0253558 | A1 * | 11/2006 | Acree et al. | 709/220 |

OTHER PUBLICATIONS

Entitled,"Sun™ One Portal Server 3.0 Rewriter Configuration and Management Guide"; Available from http://www.sun.com/solutions/blueprints/0702/816-7206-10.pdf ; (p. 1-p. 82).
Entitled, "Chapter—7 ReverseProxy"; Available from http://developer.netscape.com/docs/manuals/proxy/adminux/revpxy.htm; (8 Pages).

(Continued)

Primary Examiner—Khanh Dinh
(74) Attorney, Agent, or Firm—Narendra Reddy Thappeta

(57) ABSTRACT

An approach which enables the overhead of performing a task associated with performing a procedure (function) call to be shifted to clients from a reverse proxy server when the reverse proxy server forwards web pages, the content of which may be dynamically created on the clients according to a description (e.g., using Java Script Language). The reverse proxy server may include instructions associated with the description to re-define the procedure call such that the task (in addition to the logic of the pre-defined procedure call) is performed on the clients. For example, with reference to a procedure call containing a URL accessible only within an intranet, the reverse proxy server may insert instructions which cause each client to insert the URL of the reverse proxy server such that any requests for a resource (corresponding to the URL) are passed through the reverse proxy server.

36 Claims, 5 Drawing Sheets

OTHER PUBLICATIONS

Entitled, "Novell Documentation: Novell iChain 2.1—RewriterSupport"; Available from http://www.novell.com/documentation/lg/ichain21/index.html?page=/documentation/lg/ichain21/ichain21/data/afagb7s.html : (10 Pages).

Entitled, "Apache Module mod_rewrite-URL Rewriting Engine"; Available from http://httpd.apache.org/docs/mod/mod rewrite.html#InternalRuleset; (23 Pages).

Entitled, "Sun™ One Portal Server 3.0 Rewriter Configuration and Management Guide"; Available from http://www.sun.com/solutions/blueprints/0702/816-7206-10.pdf ; (p. 1-p. 82), Jul. 2002.

Entitled, "Chapter—7 ReverseProxy"; Available from http://developer.netscape.com/docs/manuals/proxy/adminux/revpxy.htm; (8 Pages), 1997.

Entitled, "Novell Documentation: Novell iChain 2.1—RewriterSupport"; Available from http://www.novell.com/documentation/lg/ichain21/index.html?page=/documentation/lg/ichain21/ichain21/data/afagb7s.html ; (10 Pages), Jan. 27, 2003.

Entitled, "Apache Module mod_rewrite-URL Rewriting Engine"; Available from http://httpd.apache.org/docs/mod/mod rewrite.html#InternalRuleset; (23 Pages), Jan. 27, 2003.

\* cited by examiner

FIG. 3A

```
310  <HTML>
312  <SCRIPT>
314  function openWindows()
316  {
318      open('http://www.google.com/', 'ImpliedOpenCallWindow');
320      window.open('http://intranet.sun.com/', 'ExplicitOpenCallWindow');
322  }
324  </SCRIPT>
326  <BODY>
328  <FORM>
330  <INPUT type="button" value="clickme" onClick="openWindows()"/>
332  </FORM>
334  </BODY>
336  </HTML>
```

FIG. 3B

```
350  <HTML>
352  <!-- the below line is the instruction added by reverse proxy server -->
356  <SCRIPT Language="javascript" src="RewritingInstructions.js"></SCRIPT>
358  <SCRIPT>
360  function openWindows ()
362  {
364      open('http://www.google.com/', 'ImpliedOpenCallWindow');
366      window.open('http://intranet.sun.com/', 'ExplicitOpenCallWindow');
368  }
370  </SCRIPT>
372  <BODY>
374  <FORM>
376  <INPUT type="button" value="clickme" onClick="openWindows()"/>
377  </FORM>
378  </BODY>
379  </HTML>
```

```
380  var nativeOpen = window.open; //store the native procedure pointer 382  function customOpen () //define the interceptor procedure
384  {
386      //one could prepend the reverse proxy by inspecting the arguments
388      arguments[0] = 'http://rps.sun.com/redirect/' + arguments[0];
390      var returnValue = nativeOpen(arguments[0],arguments[1]);
392      return returnValue;
394  }

396  //replace the system's procedure pointer with that
398  //of interceptor's pointer
399  window.open = customOpen;
```

FIG. 3C

REDUCING OVERHEAD IN REVERSE PROXY SERVERS WHEN PROCESSING WEB PAGES

BACKGROUND OF THE INVENTION

1. Field of the Invention

The present invention relates to reverse proxy servers commonly used in the Internet environment, and more specifically to a method and apparatus for reducing overhead in reverse proxy servers when processing web pages.

2. Related Art

Reverse proxy servers generally refer to devices which are located at a logical edge of an intranet (e.g., a network owned/operated entirely by a corporation or administrative entity) and enable clients (e.g., a personal computer with a browser software) on the Internet to access web servers located within the intranet. In an example situation, all requests (from a client to a server) for web pages from outside of an intranet, and the corresponding responses are channeled only through a reverse proxy server.

By using a reverse proxy server, providing direct access (typically at the internet protocol layer level) to the web servers (from clients on the Internet) may not be necessary, thereby potentially enhancing data security on the web servers. In other words, the reverse proxy server may serve as an intermediary between web servers (located in an intranet) and the clients (on the Internet) such that direct access of web servers from the clients on Internet may not be required.

While operating as an intermediary, a reverse proxy server may process web pages to perform several tasks. One such task is modification of URLs in a web page being forwarded to a client on Internet. The URL may be modified, for example, to ensure that a client can access web pages represented by the URLs (uniform resource locator) encoded in a web page presently being transmitted to a client. Challenges may be presented if a URL contains an address (e.g., domain name address or IP address) which is accessible only in the intranet but not from the Internet, because the client may not have direct (i.e., at IP/network layer level) access to a web server at the address.

Accordingly, a prior reverse proxy server may change a URL (in a web page presently being forwarded) to point to the reverse proxy server itself with the prior URL being provided potentially as a parameter. As a result, the reverse proxy server (accessible from Internet) receives any web page requests corresponding to the subject URL and the parameter may be used to serve the web page request, as is well known in the relevant arts.

However, it may be desirable to reduce the overhead on reverse proxy servers while processing web pages, for example, to enable a reverse proxy server to serve more requests quickly.

SUMMARY OF THE INVENTION

An aspect of the present invention enables an intermediate server (e.g., reverse proxy server) to shift the overhead of performing a task to a client when forwarding web pages. The task may be associated with processing a procedure call contained in a description of a web page.

In an embodiment, a reverse proxy server receives a description of a web page, and includes instructions associated with the description. The included instructions are designed such that execution of the instructions by a client would re-define a procedure call associated with which a task is to be performed. The re-defined procedure call performs the task in addition to performing a logic the (original) procedure call is intended to perform.

A client may receive the description of a web page along with the instructions included by a reverse proxy server. While generating the web page content, the presence of any instances of a procedure call may cause the corresponding re-defined procedure call to be automatically executed. As a task, which may otherwise need to be performed in a reverse proxy server, is performed in the client, the overhead on the reverse proxy server may be reduced.

In an implementation, the included instructions are designed to store a pointer to the procedure call in a temporary variable, to define a new procedure call to perform the task (which may need to be performed associated with the procedure call) and the logic (underlying the procedure call), and to set the procedure call to equal to the new procedure call such that said new procedure call is executed when the description contains the procedure call.

In one embodiment, the approach(es) described above are used in conjunction with a procedure call containing a URL of a resource, which is accessible only from within an Intranet. Accordingly, a reverse proxy server may include instructions to re-define the procedure call such that access requests to the resource are automatically channeled through the reverse proxy server. The reverse proxy server may merely need to include instructions, without potentially having to parse/interpret a page description for the presence of the procedure call, and the client executes instructions which cause the access requests to be channeled through the reverse proxy server.

Such ability to force channeling of access requests through reverse proxy server can be used for several purposes. For example, when a resource identified by a URL in a presently forwarded web page is accessible only in an intranet and it is desirable to enable access of the resource from Internet as well, the reverse proxy server may insert its own URL (in front of the URL of the resource) causing the access requests to be channeled through the reverse proxy server. The URL of the resource may be caused to be provided as a parameter in the received access request, and the parameter is used to access the resource (e.g., web page) and provide the same to the client.

As another example, a reverse proxy server may merely wish to monitor accesses caused through a forwarded web page, and accordingly the access requests may be caused to be received at the reverse proxy server. Even in this case, the URL of the resource may be received as a parameter, and the parameter is again used to cause retrieval of the web page when the resource relates to a web page.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein:

FIG. 3A includes an example set of instructions contained in the definition of web page content, which would be generated dynamically on a client;

FIGS. 3B and 3C together illustrate the manner in which an instruction in a web page may be re-defined to ensure that a client modifies a URL in a window.open( ) call in an embodiment of the present invention.

DETAILED DESCRIPTION OF THE PREFERRED EMBODIMENTS

1. Overview and Discussion of the Invention

An aspect of the present invention minimizes the overhead on a reverse proxy server forwarding a web page by having the reverse proxy server insert new instructions associated with the web page. The inserted instructions cause clients to implement the same tasks as the tasks the reverse proxy server may otherwise need to perform. Thus, the same objective (which may be achieved by processing on a reverse proxy server) can be achieved by having the clients perform the necessary processing, thereby reducing the overhead on the reverse proxy server.

The overhead may be reduced on a reverse proxy server by inserting instructions, which when executed on a client, cause original procedure calls (present in a received description or specification of a web page) to be re-defined such that the re-defined procedure call performs a task the reverse proxy server may otherwise need to perform. In addition, the re-defined procedure call may operate with the same logic the original procedure call operates otherwise. Such a feature may be implemented associated with web pages, the content of which is defined/generated dynamically based on execution of instructions (e.g., using scripting languages such as Java Script).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well-known structures or operations are not shown in detail to avoid obscuring the invention.

2. Example Environment

Figure 1:
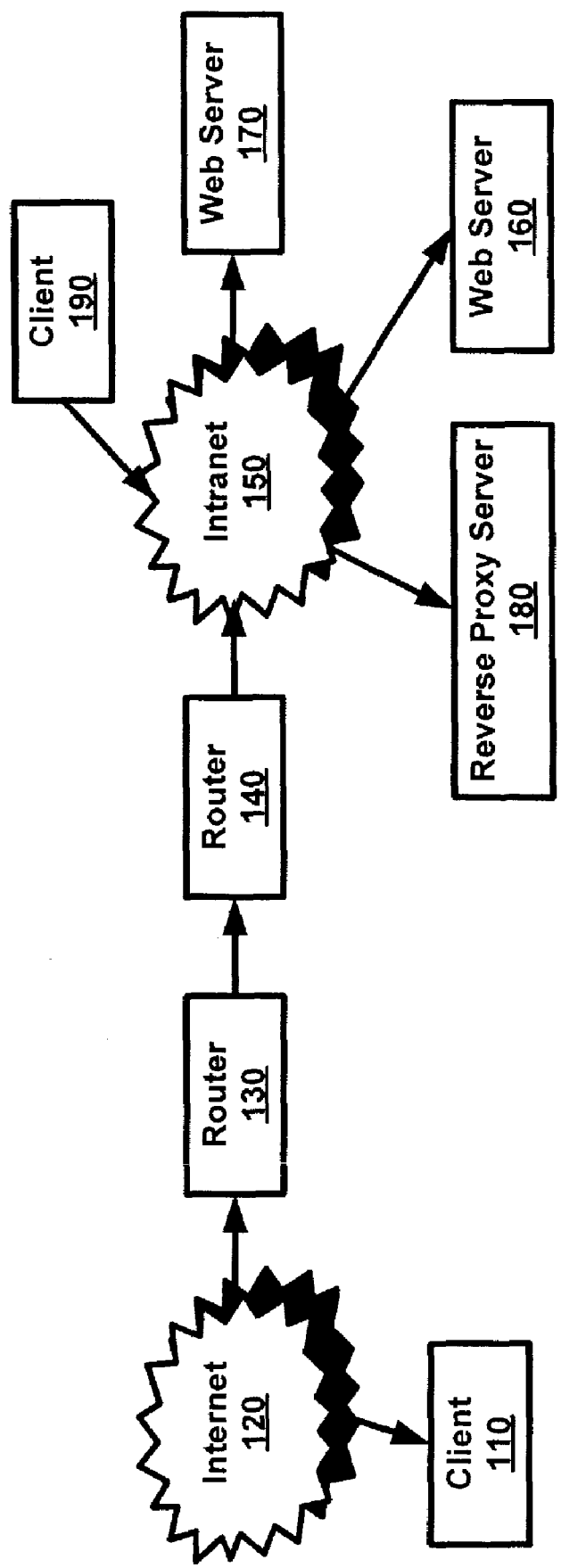
FIG. 1 is a block diagram illustrating an example environment in which the present invention can be implemented.

FIG. 1 is a block diagram illustrating an example environment in which the present invention can be implemented. The environment is shown containing clients 110 and 190, Internet 120, routers 130 and 140, intranet 150, web servers 160 and 170, and reverse proxy server 180. As described below, client 110 may access web pages provided by web servers 160 and 170, even if the web servers 160 and 170 are not accessible from Internet 120. Such a feature may be achieved by minimizing overhead on reverse proxy server 180 according to various aspects of the present invention.

Client 190 represents a system which may be used by users (typically working for the entity) to access various systems (e.g., web servers 160 and 170), possibly using both intranet 150 and Internet 120. Client 110 is shown connected to Internet 110. In general, clients 110 and 190 represent systems implemented with appropriate software (e.g., browsers) enabling access to various resources on the networks.

Internet 120 generally represents a conglomeration of potentially disparate networks, as is well known in the relevant arts. Intranet 150 represents a network (or multiple networks), typically owned and/or operated by an interested entity such as a service provider or a corporation. Each of Internet 120 and intranet 150 typically contains devices such as routers, switches, bridges and repeaters, as is also well known in the relevant arts.

Routers 130 and 140 provide connectivity between Internet 120 and intranet 150, using protocols such as Internet Protocol (IP), and may thus be implemented in a known way. Often router 140 is configured to control access of various systems within intranet 150. In some situations, the domain space/name contained in a URL may itself not be accessible from outside of intranet 150.

In general, it is sufficient to understand that resources identified by some of the URLs are not accessible directly from Internet 120, and reverse proxy server 180 performs any necessary processing on the web pages (as a part of forwarding) to facilitate such as accessing (possibly as configured/specified by an administrator). The manner in which various aspects of the present invention enable several such tasks to be performed while minimizing the overhead on reverse proxy server 180 is described in sections below.

3. Method

Figure 2:
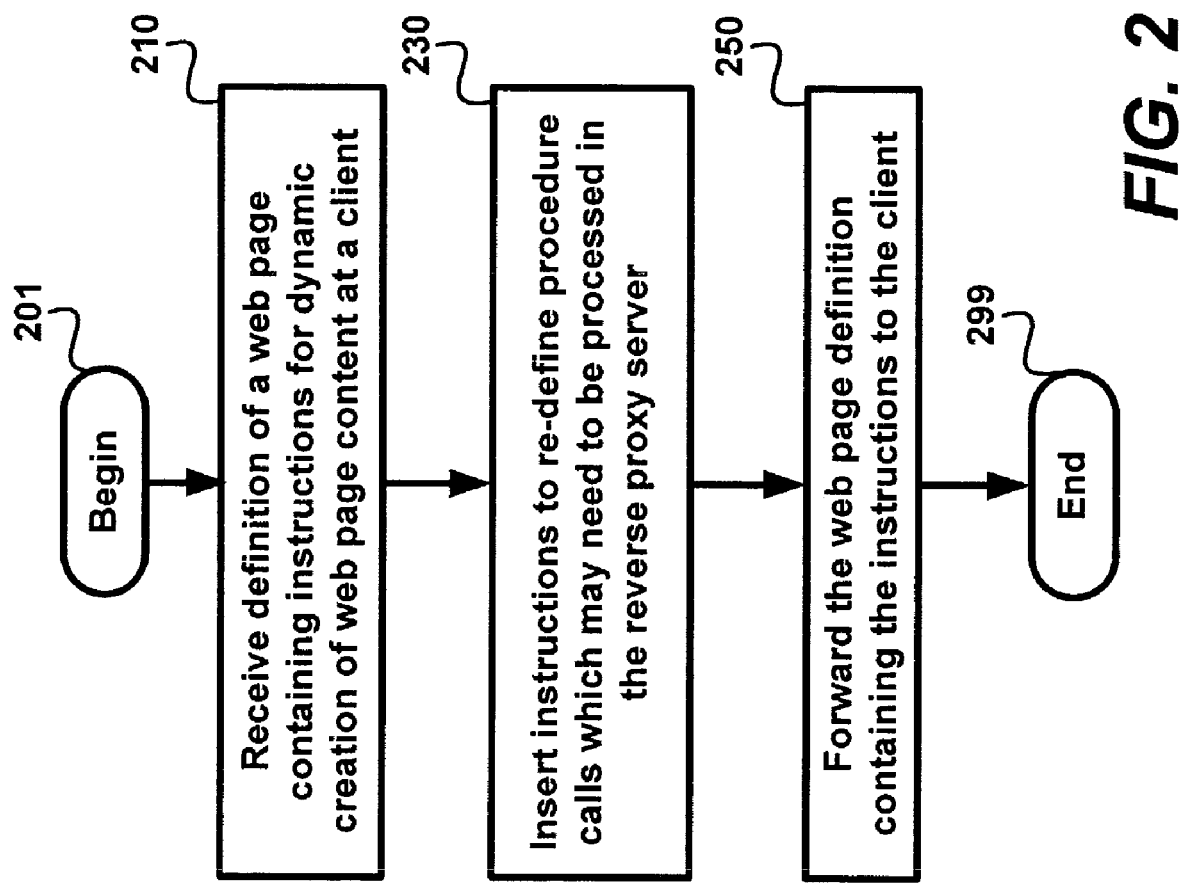
FIG. 2 is a flowchart illustrating a method according to an aspect of the present invention.

FIG. 2 is a flow-chart illustrating a method using which the overhead on a reverse proxy server may be reduced in an embodiment of the present invention. The method is described with reference to FIG. 1 for illustration. However, the method may be implemented in other environments as well. The method being in step 201, in which control immediately passes to step 210.

In step 210, reverse proxy server 180 receives instructions forming the description of a web page destined to a client located outside of intranet 150. The instructions may in turn contain procedure calls. For illustration, the web page is assumed to be destined to client 110. The web page may have originated at web server 170 in response to a request received from client 110 (and possibly forwarded by reverse proxy server 180).

In step 230, reverse proxy server 180 inserts additional instructions, which when executed on a client, causes some of the received procedure calls to be re-defined. Only the procedure calls which may need to be processed in the reverse proxy server, may be caused to be re-defined. The re-definition is designed to perform similar task (or achieve similar objective) as that would need to be performed by the reverse proxy server.

For example, with reference to modifying URLs accessible only from intranet, the inserted instructions may re-define procedure calls which could contain (intranet accessible) URLs. The inserted instructions modify the URL (as reverse proxy server 180 would otherwise modify), in addition to ensuring that the logic that would have been performed by the original procedure call is also performed by the re-defined procedure call.

In step 250, reverse proxy server 180 forwards the web page containing the instructions to client 110. Client 110 executes the instructions received as a part of definition of web page content to display the web page content. As the additional instructions which caused re-definition of some of the original calls are also executed, tasks (which may otherwise need to be executed on reverse proxy server 180) are performed on client 110. As a result, the overhead on reverse proxy server 180 may be reduced.

From the above, it may be appreciated that reverse proxy server 180 needs to insert additional instructions which cause some of the procedure calls to be re-defined at client 110. The re-defined instructions may perform similar task as a task reverse proxy server 180 may need to otherwise perform. An example of such additional instructions are described below with reference to FIGS. 3A to 3C.

4. Example Illustrating Insertion of Additional Instructions

For purpose of illustration, it is assumed web page content is specified by Java Script. Only the details of Java Script as relevant to an understanding of the presented examples are described here for conciseness. For further details on Java Script, the reader is referred to a book entitled, "JavaScript Bible", Author: Danny Goodman, Publisher: IDG Books Worldwide, ISBN Number: 0764531883, which is incorporated in its entirety herewith. In addition, the entire definition of a web page is also not provided, again in the interest of conciseness.

FIG. 3A contains instructions which would cause web pages with URLs of "'http://www.google.com/'" and "http://intranet.sun.com/'" to be respectively opened in respective new windows when a user clicks on a button entitled, "clickme". In particular, lines 314-322 define a function (hereafter "procedure") "openWindows( )", and line 330 causes the procedure to be invoked when the user clicks on "clickme".

For illustration, it is assumed that a web page with the URL ("http://intranet.sun.com") is not accessible from Internet 120 and thus it is desirable to channel requests for the web page via reverse proxy server 180. It is further assumed that it is desirable to channel requests to internet accessible URL "www.google.com" as well through reverse proxy server 180, for example, to enable an administrator to monitor the clicks through the related hyperlink. The manner in which additional instructions can be inserted to accomplish such results is described below with reference to FIGS. 3B and 3C.

FIG. 3B illustrates the additional instructions that may be inserted in the description of the web page of FIG. 3A. As may be readily observed (by comparing the contents of FIGS. 3A and 3B), FIG. 3B contains additional lines 352-356. Line 356 includes instructions which indicates that a script identified by "RewritingInstructions.js" written using Java Script language is to be executed.

FIG. 3C contains the instructions corresponding to the script "RewritingInstructions.js". Line 380 defines a variable nativeOpen which stores a (original) pointer to window.open( ) call. As may be appreciated, the storing preserves the original logic (prior to the re-definition) for window.open( ), and accordingly the corresponding instruction is referred to as native open call.

Lines 382-394 define another procedure entitled customOpen( ). Line 390 executes the native open call (defined in line 380) with a parameter 'rps.sun.com/redirect' appended before the first argument to the customOpen( ) procedure. Assuming rps.sun.com represents a URL of reverse proxy server 180, the corresponding web page requests would be received by reverse proxy server 180 automatically. Reverse proxy server 180 would receive the first argument also as a parameter with the web page request due to the operation of line 390.

Line 399, when executed on client 110, causes the window.open to point to customOpen. As a result, when a window.open( ) call is present in a description received for a web page, the customOpen( ) procedure defined above is executed instead. However, as described above, the native logic for window.open( ) is executed with the desired URL (which points to reverse proxy server 180). Thus, it may be appreciated that reverse proxy server 180 merely needs to insert the instructions of FIG. 3C and line 356 (of FIG. 3B) into a description of a web page.

Client 10 then executes all the instructions to dynamically generate the content for the web page. In particular, when a user selects (e.g., clicks on) a hyperlink containing the intranet URL, the window.open( ) call is executed. As window.open is re-defined to point to customOpen, the customOpen( ) procedure is executed. customOpen( ) in turn causes the native (i.e., prior to the re-definition) window.open( ) to be executed with the modified URL, which points to reverse proxy server 180. Thus, the web page requests are channeled through reverse proxy server 180.

Thus, it maybe appreciated that the processing overhead on reverse proxy server 180 may be reduced in several respects. For example, a web page (description) need not be parsed (examined) for intranet-only accessible URLs. In addition, as the instructions (of FIG. 3C and line 356) can be inserted without having to buffer substantial portion of the web page description, the buffering requirements may also be reduced in reverse proxy server 180.

While the examples relate substantially to the task of modifying URLs in window.open( ) call in Java Script language, it should be understood that the approach(es) described herein can be applied in the context of several other instructions, as will be apparent to one skilled in the relevant arts by reading the disclosure provided herein. Examples include, but not limited to, window.open( ), window.navigate( ), window.showModleDialog( ), window.showModelessDialog( ),window.setInterval( ), window.setTimeOut( ), Layer.load( ), Location.replace( ), document.write( ), document.writeln( ), eval( ) and Function.eval( ) procedure calls in the Java Script Language.

In reference to Java Script, the approach can be used in conjunction with processing of properties as well. Examples of such properties include, but not limited to, window.location, Location.href, Location.hash, Location.host, Location.hostname, Location.pathname, Location.port, Location.protocol, Location.search, Form.action, Image.src, and Image.lowsrc.

Similarly, Java Script represents an example tool by which web page content is dynamically generated at a client according to the instructions contained for the web page description. The concepts (described above) can be implemented in the context of several other tools, as will also be apparent to one skilled in the relevant arts by reading the disclosure provided herein. Such other implementations are also contemplated to be within the scope and spirit of the present invention.

It should be understood that different components of the reverse proxy server 180 can be implemented in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by implementing devices with a desired mix of hardware, software and/or firmware. Embodiments implemented substantially in the form of software are described below.

5. Software Implementation

Figure 4:
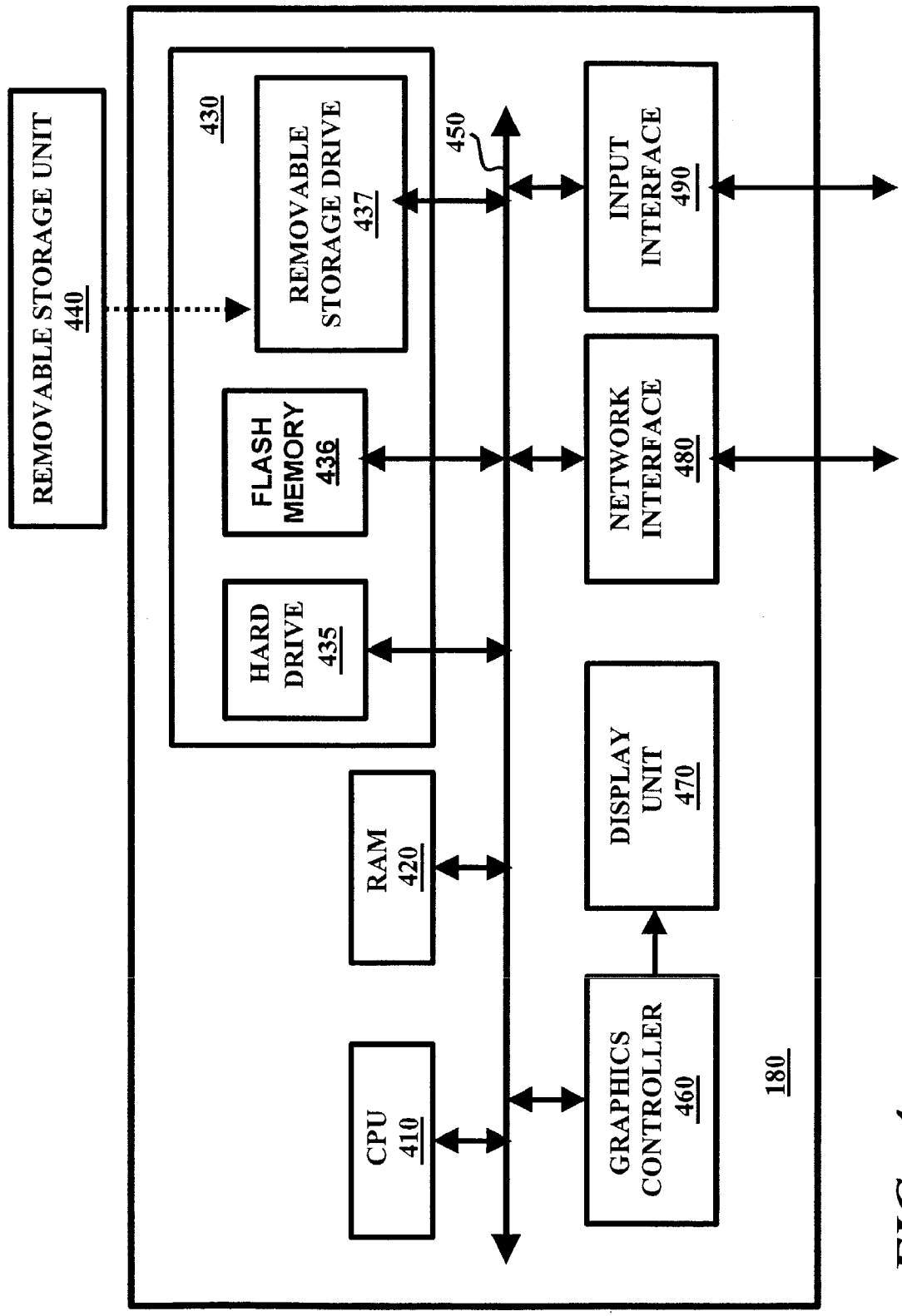
FIG. 4 is a block diagram illustrating the details of implementation of a reverse proxy server substantially in the form of software.

FIG. 4 is a block diagram illustrating the details of reverse proxy server 180 in one embodiment. Reverse proxy server 180 is shown containing processing unit (CPU) 410, random access memory (RAM) 420, storage 430, graphics controller 460, display unit 470, network interface 480 and input interface 490. Each block is described in further detail below.

Graphics controller 460 provides output signals to display unit 470, which can form the basis for a suitable interface for an administrator to interact with reverse proxy server 180. Input interface 490 (e.g., interface with a key-board and/or mouse, not shown) enables a user/administrator to provide any necessary inputs to reverse proxy server 180.

Network interface 480 may enable reverse proxy server 180 to send and receive data on communication networks using protocols such as IP. While network interface 480 is shown as a single unit for conciseness, it should be understood that network interface may contain multiple units, with each unit potentially implemented using a different protocol. Network interface 480, graphics controller 460, display unit 470, and input interface 490 may be implemented in a known way.

RAM 420 and secondary memory 430 respectively provide volatile (but of low access times) and non-volatile memories. RAM 420 receives instructions and data on path 450 from storage 430, and provides the instructions to processing unit 410 for execution. Secondary memory 430 may contain units such as hard drive 435 and removable storage drive 437. Secondary storage 430 may store the software instructions and data, which enable reverse proxy server 180 to provide several features in accordance with the present invention.

While secondary memory 430 is shown contained within reverse proxy server 180, an alternative embodiment may be implemented with the secondary memory implemented external to reverse proxy server 180, and the software instructions (described below) may be provided using network interface 480.

Some or all of the data and instructions may be provided on removable storage unit 440 (or from a network using protocols such as Internet Protocol), and the data and instructions may be read and provided by removable storage drive 437 to processing unit 410. Floppy drive, magnetic tape drive, CD-ROM drive, DVD Drive, Flash memory, removable memory chip (PCMCIA Card, EPROM) are examples of such removable storage drive 437.

Processing unit 410 may contain one or more processors. Some of the processors can be general purpose processors which execute instructions provided from RAM 420. Some can be special purpose processors adapted for specific tasks (e.g., for memory/queue management). The special purpose processors may also be provided instructions from RAM 420.

In general, processing unit 410 reads sequences of instructions from various types of memory medium (including RAM 420, storage 430 and removable storage unit 440), and executes the instructions to provide various features of the present invention. Thus, the embodiment(s) of FIG. 4 can be used to provide several features according to the present invention.

6. CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of enabling a reverse proxy server to control access of a resource from a client, said resource being identified by a Uniform Resource Locator (URL), wherein said client is located outside of an intranet on which said reverse proxy server is located said URL being present in a web page, said method comprising:

receiving a description of said web page including a line containing said URL represented in the form of a first string;

inserting a plurality of instructions into said description, wherein execution of said plurality of instructions by said client is designed to cause said client to convert said first string to a second string, wherein said second string also represents said URL when said resource is sought to be accessed from said client using said web page; and sending said description including said line as received in said description, along with said plurality of instructions to said client, wherein said resource is not directly accessible from said client, wherein said second string is designed to include an address of said reverse proxy server such that said client accesses said resource through said reverse proxy server.

2. The method of claim 1, wherein said resource comprises another web page accessible from said web page, wherein said second string comprises a new URL containing at least a portion of said first string as a parameter, said method further comprising:

receiving said new URL when said resource is sought to be accessed from said client using said web page;

using said portion to retrieve said another web page; and forwarding said another web page to said client.

3. The method of claim 2, wherein said plurality of instructions are designed to re-define an original instruction containing said URL to generate a re-defined instruction, wherein said original instruction is contained in said description, said original instruction containing said first string and said re-defined instruction containing said second string, wherein said second string comprises a URL of said reverse proxy server causing said client to access said reverse proxy server when said resource is sought to be accessed.

4. The method of claim 3, wherein said plurality of instructions are designed to:

store a pointer to a procedure call in a temporary variable, wherein said procedure call is contained in said original instruction;

define a new procedure call to open said another web page, wherein said new procedure call contains said URL of said reverse proxy server and said portion; and set said procedure call to equal said new procedure call.

5. The method of claim 4, wherein said description is consistent with Java Script language, said temporary variable, said procedure call, and said new procedure call respectively equaling nativeOpen( ), window.open( ), and customOpen( ), wherein said store is attained by using a first instruction of (var nativeOpen=window.open), wherein said define is attained by using a second set of instructions of:

function customOpen( )
{
arguments[0]='http://rps.sun.com/redirect/'+arguments[0];
var returnValue=nativeOpen(arguments[0],arguments[1]);
return returnValue;

}, wherein rps.sun.com represents said URL of said reverse proxy server, and arguments[0] and arguments[1] respectively represent a first parameter and a second parameter received associated with said customOpen( ) procedure call, wherein said set is attained using a third instruction of (window.open=customOpen), and wherein said first instruction, said second set of instructions and said third instruction are comprised in said plurality of instructions inserted in said inserting.

6. A method of shifting overhead of performing a task from an intermediate server to a client, said task being associated with processing a procedure call contained in a web page provided from a web server, said method being performed in said intermediate server, said method comprising:

receiving a description of said web page including said procedure call in a line of said description;

including a plurality of instructions associated with said description, wherein execution of said plurality of instructions by said client is designed to re-define said procedure call, wherein a resulting re-defined procedure call performs said task in addition to performing a logic said procedure call is intended to perform; and sending said description including said line as received in said description, along with said plurality of instructions to said client, wherein said plurality of instructions are designed to:
store a pointer to said procedure call in a temporary variable;
define a new procedure call to perform said task and said logic; and
set said procedure call to equal said new procedure call such that said new procedure call is executed when said description contains said procedure call.

7. The method of claim 6, wherein said description enables dynamic creation of a content for said web page.

8. The method of claim 7, wherein said intermediate server comprises a reverse proxy server.

9. The method of claim 8, wherein said procedure call contains a URL accessible only from an intranet, and said task comprises inserting an address of said reverse proxy server in a parameter of said procedure call.

10. The method of claim 8, wherein said procedure call comprises one of window.open( ), window.navigate( ), window.showModleDialog( ), window.showModelessDialog( ), window.setInterval( ), window.setTimeOut( ), Layer.load( ), Location.replace( ), document.write( ), document.writeln( ), eval( ) and Function.eval( ) procedures, and window.location, Location.href, Location.hash, Location.host, Location.hostname, Location.pathname, Location.port, Location.protocol, Location.search, Form.action, Image.src, and Image.lowsrc properties.

11. A computer readable medium carrying one or more sequences of instructions for enabling a reverse proxy server to control access of a resource from a client, said resource being identified by a Uniform Resource Locator (URL), wherein said client is located outside of an intranet on which said reverse proxy server is located, said URL being present in a web page, wherein execution of said one or more sequences of instructions by one or more processors contained in said reverse proxy server causes said one or more processors to perform the actions of:

receiving a description of said web page including a line containing said URL represented in the form of a first string;

inserting a plurality of instructions into said description, wherein execution of said plurality of instructions by said client is designed to cause said client to convert said first string to a second string, wherein said second string also represents said URL when said resource is sought to be accessed from said client using said web page; and sending said description including said line as received in said description, along with said plurality of instructions to said client, wherein said resource is not directly accessible from said client, wherein said second string is designed to include an address of said reverse proxy server such that said client accesses said resource through said reverse proxy server.

12. The computer readable medium of claim 11, wherein said resource comprises another web page accessible from said web page, wherein said second string comprises a new URL containing at least a portion of said first string as a parameter, further comprising receiving said new URL when said resource is sought to be accessed from said client, wherein said portion is used to retrieve said another web page.

13. The computer readable medium of claim 12, wherein said plurality of instructions are designed to re-define an original instruction containing said URL to generate a re-defined instruction, wherein said original instruction is contained in said description, said original instruction containing said first string and said re-defined instruction containing said second string, wherein said second string comprises a URL of said reverse proxy server causing said client to access said reverse proxy server when said resource is sought to be accessed.

14. The computer readable medium of claim 13, wherein said plurality of instructions are designed to:
store a pointer to a procedure call in a temporary variable;
define a new procedure call to open said another web page, wherein said new procedure call contains said URL of said reverse proxy server and said portion; and
set said procedure call to equal said new procedure call.

15. The computer readable medium of claim 14, wherein said description is consistent with Java Script language, said temporary variable, said procedure call, and said new procedure call respectively equaling nativeOpen( ), window.open( ), and customOpen( ), wherein said store is attained by using a first instruction of (var nativeOpen=window.open), wherein said define is attained by using a second set of instructions of:
function customOpen( )
{
 arguments[0]='http://rps.sun.com/redirect/'+arguments[0];
 var returnValue=nativeOpen(arguments[0],arguments[1]);
 return returnValue;
}, wherein rps.sun.com represents said URL of said reverse proxy server, and arguments[0] and arguments[1] respectively represent a first parameter and a second parameter received associated with said customOpen( ) procedure call, wherein said set is attained using a third instruction of (window.open=customOpen), and wherein said first instruction, said second set of instructions and said third instruction are comprised in said plurality of instructions inserted in said inserting.

16. A computer readable medium carrying one or more sequences of instructions for shifting overhead of performing a task from an intermediate server to a client, said task being associated with processing a procedure call contained in a web page provided from a web server, wherein execution of said one or more sequences of instructions by one or more processors contained in an intermediate server causes said one or more processors to perform the actions of:
receiving a description of said web page including said procedure call in a line of said description;
including a plurality of instructions associated with said description, wherein execution of said plurality of instructions by said client is designed to re-define said procedure call, wherein a resulting re-defined procedure call performs said task in addition to performing a logic said procedure call is intended to perform; and
sending said description including said line as received in said description, along with said plurality of instructions to said client,
wherein said plurality of instructions are designed to:
store a pointer to said procedure call in a temporary variable;
define a new procedure call to perform said task and said logic; and
set said procedure call to equal said new procedure call such that said new procedure call is executed when said description contains said procedure call.

17. The computer readable medium of claim 16, wherein said description enables dynamic creation of a content for said web page.

18. The computer readable medium of claim 17, wherein said intermediate server comprises a reverse proxy server.

19. The computer readable medium of claim 18, wherein said procedure call contains a URL accessible only from an intranet, and said task comprises inserting an address of said reverse proxy server in a parameter of said procedure call.

20. A reverse proxy server enabling a client to access a resource identified by a Uniform Resource Locator (URL), said URL having an address accessible only within an intranet, wherein said client is located outside of said intranet, said URL being present in a web page, said reverse proxy server comprising:
means for receiving a description of said web page including a line containing said URL represented in the form of a first string;
means for inserting a plurality of instructions into said description, wherein execution of said plurality of instructions by said client is designed to cause said client to convert said first string to a second string, wherein said second string also represents said URL when said resource is sought to be accessed from said client using said web page; and
means for sending said description including said line as received in said description, along with said plurality of instructions to said client,
wherein said resource is not directly accessible from said client, wherein said second string is designed to include an address of said reverse proxy server such that said client accesses said resource through said reverse proxy server.

21. The reverse proxy server of claim 20, wherein said resource comprises another web page accessible from said web page, wherein said second string comprises a new URL containing at least a portion of said first string as a parameter, said reverse proxy server further comprising means for receiving said new URL when said resource is sought to be accessed, wherein said portion is used to retrieve said another web page.

22. The reverse proxy server of claim 21, wherein said plurality of instructions are designed to re-define an original instruction containing said URL to generate a re-defined instruction, wherein said original instruction is contained in said description, said original instruction containing said first string and said re-defined instruction containing said second string, wherein said second string comprises a URL of said reverse proxy server causing said client to access said reverse proxy server when said resource is sought to be accessed.

23. The reverse proxy server of claim 22, wherein said plurality of instructions are designed to:
store a pointer to a procedure call in a temporary variable, wherein said procedure call is contained in said original instruction;
define a new procedure call to open said another web page, wherein said new procedure call contains said URL of said reverse proxy server and said portion; and
set said procedure call to equal said new procedure call.

24. A intermediate server shifting overhead of performing a task from said intermediate server to a client, said task being associated with processing a procedure call contained in a web page provided from a web server, said intermediate server comprising:
means for receiving a description of said web page including said procedure call in a line of said description;
means for including a plurality of instructions associated with said description, wherein execution of said plurality of instructions by said client is designed to re-define said procedure call, wherein a resulting re-defined procedure call performs said task in addition to performing a logic said procedure call is intended to perform; and
means for sending said description including said line as received in said description, along with said plurality of instructions to said client,
wherein said plurality of instructions are designed to:
store a pointer to said procedure call in a temporary variable;
define a new procedure call to perform said task and said logic; and
set said procedure call to equal said new procedure call such that said new procedure call is executed when said description contains said procedure call.

25. The intermediate server of claim 24, wherein said description enables dynamic creation of a content for said web page.

26. The intermediate server of claim 25, wherein said intermediate server comprises a reverse proxy server.

27. The intermediate server of claim 26, wherein said procedure call contains a URL accessible only from an intranet, and said task comprises inserting an address of said reverse proxy server in a parameter of said procedure call.

28. A reverse proxy server enabling a client to access a resource identified by a Uniform Resource Locator (URL), said URL having an address accessible only within an intranet, wherein said client is located outside of said intranet, said URL being present in a web page, said reverse proxy server comprising:
a network interface receiving a description of said web page including a line containing said URL represented in the form of a first string; and
a processor inserting a plurality of instructions into said description, wherein execution of said plurality of instructions by said client is designed to cause said client to convert said first string to a second string, wherein said second string also represents said URL when said resource is sought to be accessed from said client using said web page, said processor sending said description including said line as received in said description, along with said plurality of instructions to said client using said network interface, wherein said resource is not directly accessible from said client, wherein said second string is designed to include an address of said reverse proxy server such that said client accesses said resource through said reverse proxy server.

29. The reverse proxy server of claim 28, wherein said resource comprises another web page accessible from said web page, wherein said second string comprises a new URL containing at least a portion of said first string as a parameter, wherein said network interface receives said new URL when said resource is sought to be accessed.

30. The reverse proxy server of claim 29, wherein said plurality of instructions are designed to re-define an original instruction containing said URL to generate a re-defined instruction, wherein said original instruction is contained in said description, said original instruction containing said first string and said re-defined instruction containing said second string, wherein said second string comprises a URL of said reverse proxy server causing said client to access said reverse proxy server when said resource is sought to be accessed.

31. The reverse proxy server of claim 30, wherein said plurality of instructions are designed to:
    store a pointer to a procedure call in a temporary variable, wherein said procedure call is contained in said original instruction;
    define a new procedure call to open said another web page, wherein said new procedure call contains said URL of said reverse proxy server and said portion; and
    set said procedure call to equal said new procedure call.

32. An intermediate server shifting overhead of performing a task from said intermediate server to a client, said task being associated with processing a procedure call contained in a web page provided from a web server, said intermediate server comprising:
    an network interface receiving a description of said web page including said procedure call in a line of said description; and
    a processor including a plurality of instructions associated with said description, wherein execution of said plurality of instructions by said client is designed to re-define said procedure call, wherein a resulting re-defined procedure call performs said task in addition to performing a logic said procedure call is intended to perform, said processor sending said description including said line as received in said description by said network interface, along with said plurality of instructions to said client using said network interface,
    wherein said plurality of instructions are designed to:
        store a pointer to said procedure call in a temporary variable;
        define a new procedure call to perform said task and said logic; and
        set said procedure call to equal said new procedure call such that said new procedure call is executed when said description contains said procedure call.

33. The intermediate server of claim 32, wherein said description enables dynamic creation of a content for said web page.

34. The intermediate server of claim 33, wherein said intermediate server comprises a reverse proxy server.

35. The intermediate server of claim 34, wherein said procedure call contains a URL accessible only from an intranet, and said task comprises inserting an address of said reverse proxy server in a parameter of said procedure call.

36. The intermediate server of claim 34, wherein said procedure call contains a URL identifying a resource not accessible from Internet, and said task comprises inserting an address of said reverse proxy server in a parameter of said procedure call, wherein said reverse proxy server is accessible from said Internet.

* * * * *